(12) United States Patent
Rebello et al.

(10) Patent No.: US 7,219,043 B2
(45) Date of Patent: *May 15, 2007

(54) METHOD AND SYSTEM FOR REVERSE AND RE-ENGINEERING PARTS

(75) Inventors: Alexander Bernard Flavian Rebello, Scotia, NY (US); Michael Charles Ostrowski, Glenville, NY (US); Kena Kimi Yokoyama, Latham, NY (US); Vinod Padmanabhan Kumar, Guilderland, NY (US); Dean Michael Robinson, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 868 days.

This patent is subject to a terminal disclaimer.

(21) Appl. No.: 09/683,696

(22) Filed: Feb. 5, 2002

(65) Prior Publication Data

US 2003/0149498 A1    Aug. 7, 2003

(51) Int. Cl.
 *G06G 7/48* (2006.01)
 *G06F 19/00* (2006.01)
(52) U.S. Cl. .................. 703/7; 703/6; 700/97; 700/182
(58) Field of Classification Search .................... 703/6, 703/7; 700/97, 182
See application file for complete search history.

(56) References Cited

U.S. PATENT DOCUMENTS

| | | | |
|---|---|---|---|
| 4,995,087 A | 2/1991 | Rathi et al. | |
| 5,033,005 A | 7/1991 | Haske | |
| 5,177,689 A | 1/1993 | Kinasi et al. | |
| 5,191,534 A | 3/1993 | Orr et al. | |
| 5,309,366 A | 5/1994 | Grenkowitz | |
| 5,432,703 A | 7/1995 | Clynch et al. | |

(Continued)

FOREIGN PATENT DOCUMENTS

EP    1050786    8/2000

(Continued)

OTHER PUBLICATIONS

Jones, S. "Modern Manufacturing Methods." 3rd Int'l Conf. on Factory, 2000. Jul. 29, 1992. pp. 136-144.*

(Continued)

*Primary Examiner*—Paul Rodriguez
*Assistant Examiner*—Ayal I. Sharon
(74) *Attorney, Agent, or Firm*—Fletcher Yoder

(57) ABSTRACT

A method of re-engineering a part includes generating a parametric master model for the part from an editable geometry for the part and generating a manufacturing context model from a design master model. The design master model includes the parametric master model, and the manufacturing context model includes a number of tooling features. The method further includes creating a tooling master model from the manufacturing context model. The tooling master model includes a tooling geometry for the part. A system for re-engineering a part includes a part design master model module configured to generate the parametric master model from the editable geometry and a tooling master model module configured to receive the parametric master model, to generate the manufacturing context model from the parametric master model, and to create the tooling master model from the manufacturing context model.

34 Claims, 10 Drawing Sheets

U.S. PATENT DOCUMENTS

| | | |
|---|---|---|
| 5,434,803 A | 7/1995 | Yoshida |
| 5,479,593 A | 12/1995 | Brewer et al. |
| 5,485,390 A | 1/1996 | LeClair et al. |
| 5,487,012 A | 1/1996 | Topholm et al. |
| 5,539,649 A | 7/1996 | Walsh et al. |
| 5,542,030 A | 7/1996 | Gutfinger |
| 5,543,103 A | 8/1996 | Hogan et al. |
| 5,552,992 A | 9/1996 | Hunter |
| 5,552,995 A | 9/1996 | Sebastian |
| 5,594,651 A | 1/1997 | St. Ville |
| 5,687,094 A | 11/1997 | Kagawa et al. |
| 5,742,288 A | 4/1998 | Nishizaka et al. |
| 5,799,293 A | 8/1998 | Kaepp |
| 5,822,206 A * | 10/1998 | Sebastian et al. ............. 700/97 |
| 5,926,388 A | 7/1999 | Kimbrough et al. |
| 5,933,353 A | 8/1999 | Abriam et al. |
| 5,966,310 A | 10/1999 | Maeda et al. |
| RE36,602 E | 3/2000 | Sebastian et al. |
| 6,036,345 A | 3/2000 | Jannette et al. |
| 6,065,857 A | 5/2000 | Hazama et al. |
| 6,148,277 A | 11/2000 | Asava et al. |
| 6,233,538 B1 * | 5/2001 | Gupta et al. ................... 703/6 |
| 6,578,188 B1 * | 6/2003 | Pang et al. .................... 716/19 |
| 6,735,489 B1 * | 5/2004 | Khurana et al. ............... 700/95 |
| 6,785,641 B1 * | 8/2004 | Huang ........................... 703/7 |
| 6,856,842 B2 * | 2/2005 | Rebello et al. ................ 700/31 |
| 2002/0090130 A1 * | 7/2002 | Liasi et al. .................. 382/152 |

FOREIGN PATENT DOCUMENTS

| | | |
|---|---|---|
| EP | 0992869 | 12/2000 |
| GB | 2350809 | 12/2000 |

OTHER PUBLICATIONS

Srinivasan, V. "Issues in Conditional Tolerances for CAD Systems." 1985 IEEE Conf. on Robotics and Automation. Mar. 1985. pp. 373-375.*

U.S. Appl. No. 09/186,208, filed Nov. 5, 1998, Beauchamp et al.

U.S. Appl. No. 09/350,384, filed Jul. 9, 1999, Bauer et al.

European Patent Search EP 03251594, Oct. 27, 2003.

* cited by examiner

METHOD AND SYSTEM FOR REVERSE AND RE-ENGINEERING PARTS

BACKGROUND OF INVENTION

This invention relates to a method and system for reverse and reengineering existing parts, such as turbine blades, and to a method for manufacturing parts. More particularly, the invention relates to a method and system for reverse and reengineering existing parts, by developing parametric master models for part designs and tooling master models for tooling geometries, and to a method of manufacturing employing the parametric and the tooling master models.

Machines subjected to harsh operating conditions include a variety of parts that must be replaced throughout the service life of the machine. For example, a turbine engine includes turbine blades and vanes requiring periodic repair or replacement due to extreme thermal operating conditions. Due to long service lives for the machines, a large number of the parts currently in service have no drawings for the part design or the tooling, due to poor archiving and storage. Moreover, only recently has the development and manufacturing of parts moved into the era of three-dimensional (3D) models and other electronic engineering systems. Accordingly, for older parts, even where drawings have been retained, only two-dimensional (2D) drawings are available for the part design and, on occasion, for the tooling.

In these circumstances, replacement of the worn parts typically requires reverse engineering the part from an available physical specimen, which attempts to make a close copy of the part. However, in many cases technology has improved since the part was designed. Accordingly, it is often beneficial to re-engineer the part through redesign, the incorporation of new materials, and/or manufacturing improvements, in order to improve the performance, service life, and/or reliability of the part. However, due to the absence of 3D part design and tooling drawings for older parts, such parts must be re-engineered, starting from an available physical specimen.

Current reverse and re-engineering processes are time consuming and laborious. For example, complex machines such as landing gears typically require an eighteen to twenty-four (18–24) month cycle to create the forging, resulting in a total cycle time of two to three years to obtain a reverse or reengineered landing gear that has been machined, shot-peened, and painted. Moreover, current reverse engineering processes for parts with any complexity requires a considerable amount of part-family specific engineering knowledge and judgment. Thus, the engineer performing the reverse engineering must be experienced in reverse engineering the same type of parts. This requirement increases cycle time and reduces throughput due to the short supply of such engineers possessing such part-family specific experience.

Current reverse and re-engineering (collectively called "re-engineering" herein) processes fail to include appropriate enablers that facilitate the engineering process as a whole. Commercially available tools marketed as reverse engineering tools typically address localized geometry reconstruction for certain classes of parts. However, the commercial tools typically are applicable only to less than about five percent (5%) of the reverse engineering cycle. Consequently, conventional reengineering processes remain labor intensive for the experienced engineers. Moreover, sole reliance on experienced engineers, to apply part design and tooling design rules, makes it easy to overlook design rules that could prove critical to the function of the part.

It would therefore be desirable to develop a method and system for obtaining functional equivalents or upgrades for parts (reverse or re-engineer the part) where only the physical part or incomplete design information is available. It would further be desirable for the method and system to apply knowledge acquired through part and tooling design experience, in order to reduce the burdens of reverse and reengineering complex parts on experienced engineers. In addition, it would be desirable for the method and system to integrate information across the design system and database, to ensure the consistency of application models used to develop and evaluate part design and tooling geometries.

SUMMARY OF INVENTION

Briefly, in accordance with an embodiment of the present invention, a method of re-engineering a part includes generating a parametric master model for the part from an editable geometry for the part and generating a manufacturing context model from a design master model. The design master model includes the parametric master model, and the manufacturing context model includes a number of tooling features. The method further includes creating a tooling master model from the manufacturing context model. The tooling master model includes a tooling geometry for the part.

In accordance with another embodiment of the present invention, a system for reengineering a part includes a part design master model module configured to generate the parametric master model from the editable geometry. The system further includes a tooling master model module configured to receive the parametric master model, to generate the manufacturing context model from the parametric master model, and to create the tooling master model from the manufacturing context model.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
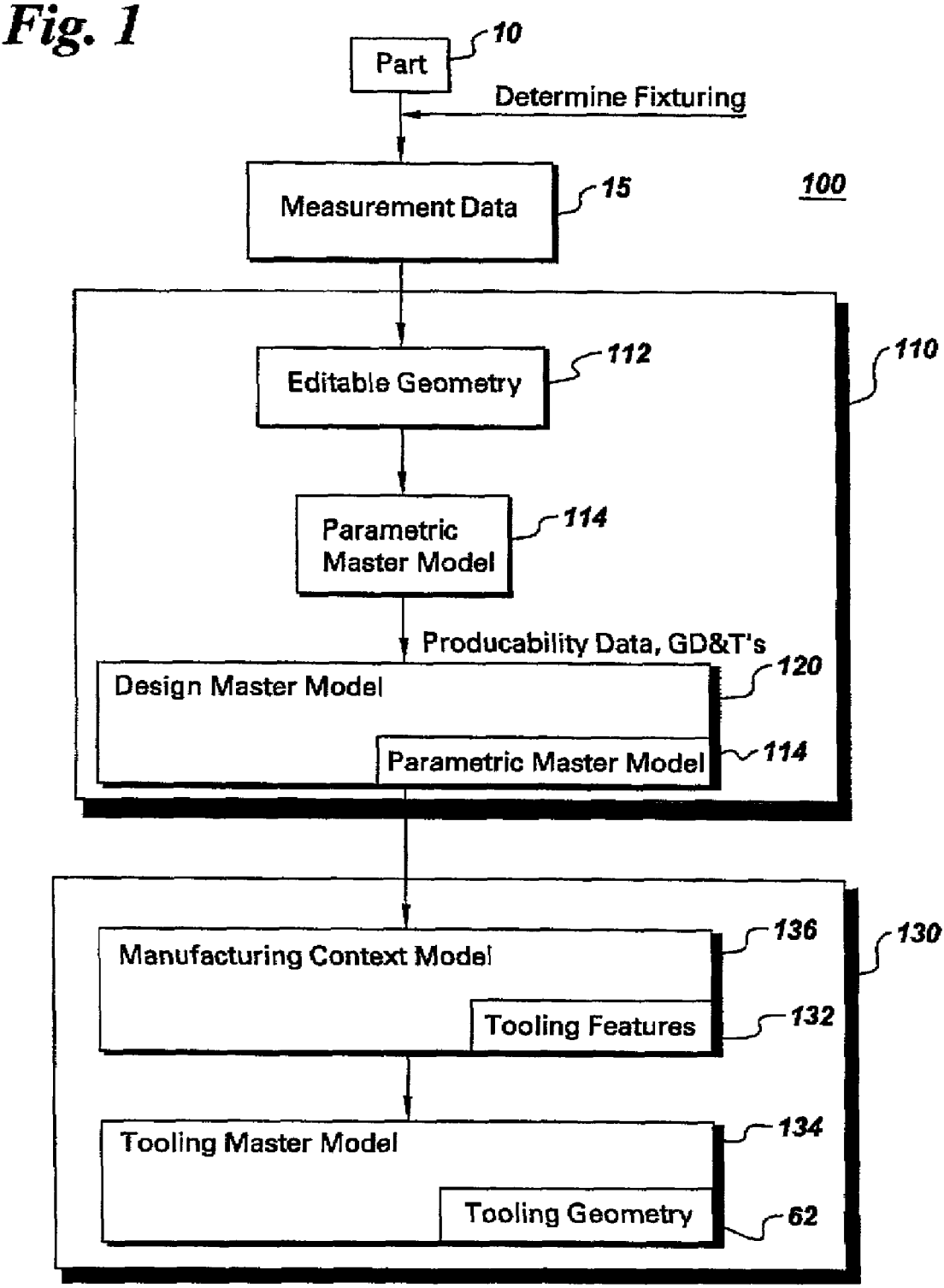
FIG. 1 shows a schematic block diagram (e.g., flow chart) of an implementation of a method of re-engineering a part.
Figure 3:
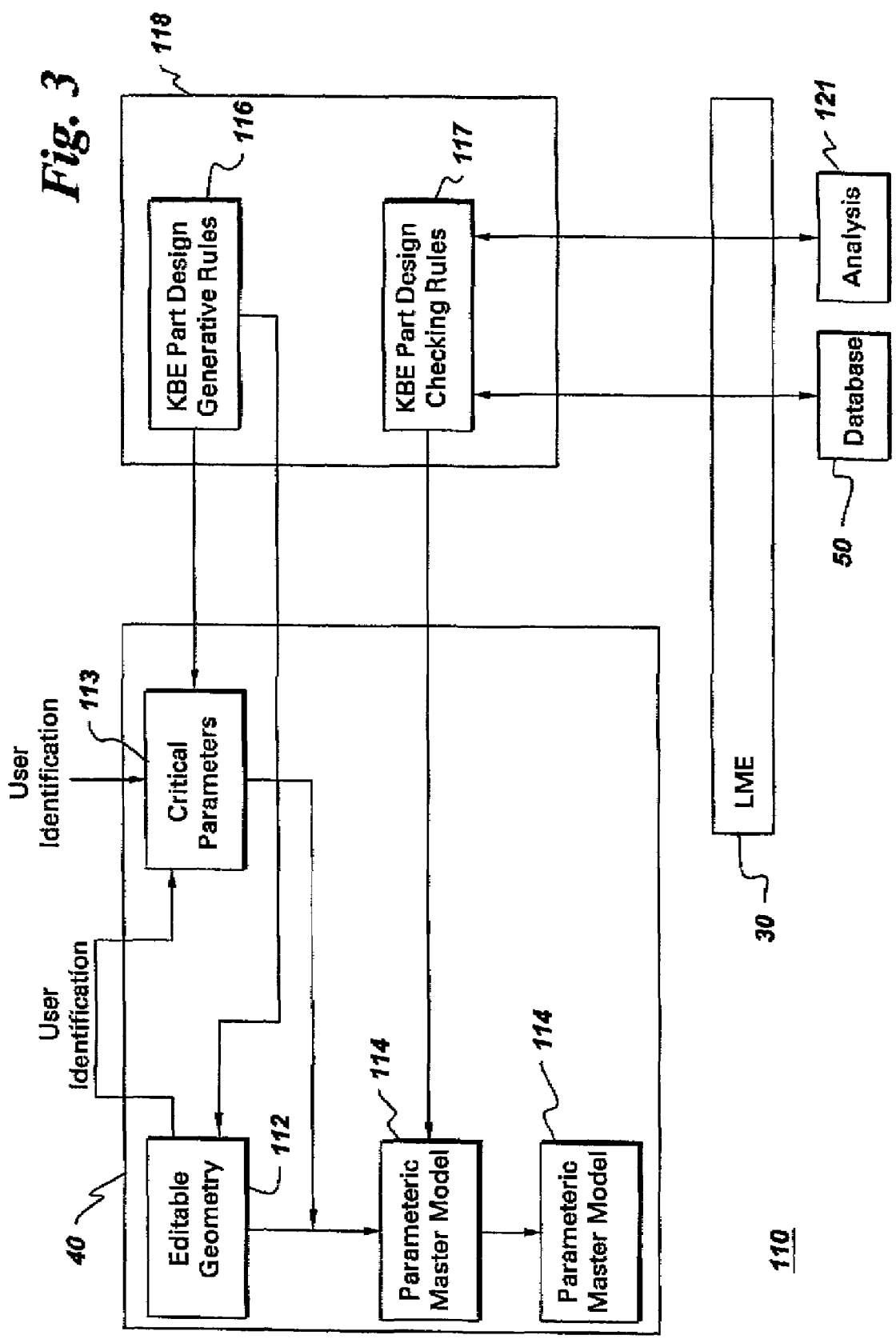
FIG. 3 shows a hybrid system/process block diagram for generation of a parametric master model from the editable geometry using KBE Part Design Generative and Checking Rules.

A method embodiment of the invention is described generally with reference to the flow chart shown in FIG. 1. The method of re-engineering a part 10 includes generating a parametric master model 114 for part 10 from an editable geometry 112 for part 10. As used here, the phrase "re-engineering a part" means obtaining functional equivalents (often called "reverse engineering") or upgrades (often called "re-engineering") for an existing part 10. Functional equivalents to an existing part 10 are parts that are structurally (shape, material characteristics) similar to the existing part and that have similar performance and life characteristics, whereas upgrades are parts that have improved performance or life characteristics and may be structurally dissimilar. Further, the phrase "existing part" means either an actual physical part or a part for which legacy designs exist, for example 2D drawings for the part design. Accordingly, parametric master model 114 incorporates a design for part 10 obtained by re-engineering part 10, either to have similar or improved performance characteristics. As indicated in FIG. 3, parametric master model 114 is generated from editable geometry 112 in a Computer Aided Design (CAD) System (or Program) 40. An exemplary editable geometry 112 is an editable non-parametric CAD model (also indicated by reference numeral 112) generated using CAD System 40. Commercially available examples of CAD software include Unigraphics sold by Unigraphics Solutions, ProEngineer sold by Parametric Technologies, CATIA sold by IBM/Dassault Systemes, I-DEAS sold by SDRC, and Autocad. However, the present invention is by no means limited to any particular CAD software but rather embraces the use of any CAD software.

By "editable," it is meant that the geometry 112 can be altered in its native form, for example using the CAD software. However, as used here "non-parametric" means that the geometry 112 does not scale with a set of parameters but rather must be edited in a piecemeal fashion. In contrast, a "parametric" model, such as parametric master model 114, is a representation of part 10, for example a computer model usable within CAD software, in which part geometry is described in terms of features, such as holes, lines, curves, chamfers, blends, radii, well defined shapes, user defined shapes, shapes from shape libraries, etc. and parameters associated with and between these features. At any given time, the parameters take on specific numerical values or relationships between parameters. Desirably, this parametric representation of part 10 is flexible, in that part 10 is described by a set of parameters, for example length, width, and height, all of which can vary. Consequently, parametric master model 114 can be altered all at once by changing the value of one or more of the parameters. Moreover, because the model is parametric, the method applies to an entire part family. Parts belonging to a part family differ only with respect to the values of the parameters describing the parts or with respect to small topological changes, for example different hole sizes or positions corresponding to different machining steps.

The method further includes generating a manufacturing context model 136 from design master model 120. Manufacturing processes typically involve one or more manufacturing steps. The desired end-product of any particular step in the manufacturing process is a "shape" of the part being manufactured. Manufacturing context model 136 prescribes the end result (or "shape") of each of the manufacturing steps. In other words, the goal of each manufacturing step is to create a part that looks like the manufacturing context model 136 for that manufacturing step. As used here, the phrase "context model" means a model having an associative relationship with the underlying parametric model, such that when a parameter value is changed in the underlying parametric model, the context model is automatically updated to reflect this change.

Figure 9:
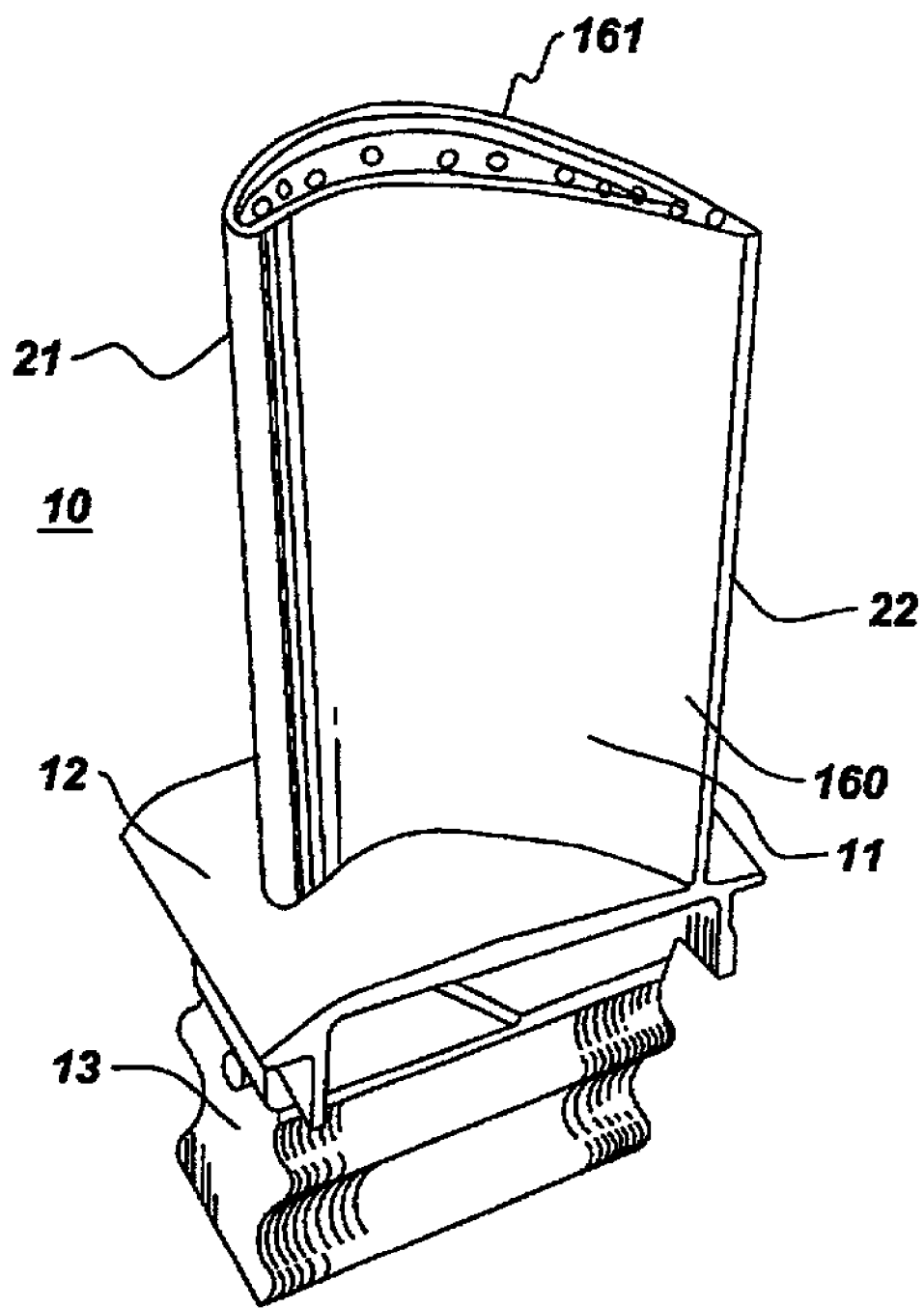
FIG. 9 shows a turbine blade.

Manufacturing context model 136 includes a number of tooling features 132. Tooling features 132 provide tooling geometries for part features. Exemplary tooling features for blade 10 include airfoil tooling geometry (not shown) for forming airfoil 11, a cavity tooling geometry for forming dovetail 12, and a platform tooling geometry for forming platform 13, as shown for example in FIG. 9. The tooling features 132, in turn, may include tooling sub-features (also indicated by reference numeral 132 and generally referred to also as "tooling features" 132). For example, the airfoil tooling geometry may include pressure side and suction side tooling subfeatures for forming pressure side 160 and suction side 161 of airfoil 11.

As indicated in FIG. 1, design master model 120 includes parametric master model 114. According to one example, design master model 120 further includes a set of geometric dimensions and tolerances (GD&Ts), a number of CAD drawings 122 of part 10, and a set of inspection data. Exemplary CAD drawings of part 10 include CAD drawings of reengineered part 10. Exemplary inspection data specify what is to be inspected on a manufactured part to qualify the manufactured part and, as such, would be an input to inspection systems.

A tooling master model 134 is created from manufacturing context model 136. The tooling master model includes a tooling geometry 62 for part 10 and is a parametric model. Tooling geometry 62 is obtained from tooling features 132, for example, by applying tooling design rules that impose continuity or other matching conditions for adjoining tooling features. According to a particular embodiment, tooling master model 134 further includes process parameters for each step and toolpaths. Toolpaths are included for manufacturing processes that include one or more machining or material addition steps. Examples of toolpaths include paths for cutters, lasers, and drills, as well as for solid free form fabrication (for example, laser cladding) and rapid prototyping (for example stereolithography and LOM). After addition of tolerances (discussed in greater detail below with respect to FIG. 8), tooling master model 134 is used for generating hard tooling for manufacturing part 10, as reengineered. Hard tooling 400 is the physical tooling used to form the re-engineered parts. Hard tooling may be made of hard materials (for example, metals, such as hardened tool steels), soft materials (for example, epoxies, low melting point alloys, wax, wood, and aluminum), and combinations thereof.

In order to reengineer part 10, the method according to one embodiment further includes obtaining data characterizing part 10 and generating editable geometry 112 for part 10 from the data. For a second embodiment, editable geometry 112 is obtained from legacy design information. Data acquisition is performed, by measuring part 10 or using an existing data set characterizing part 10. Alternatively, legacy CAD input can be used to obtain editable geometry 112. In order to generate editable geometry 112, the data includes geometric data for part 10. It is also useful for the data to further include attribute data for part 10. Generally, attributes are non-geometric characteristics, for example surface finish, material type, the presence of coating on part 10 and density. Differentiating attribute and geometric data are useful in that it permits geometric data to be suppressed during different analyses, where a specific geometric feature is not necessary for the analysis. For example, a bolt hole is typically present during a stress analysis but omitted during a computational fluid dynamics analysis.

Before measuring part 10, it is desirable to determine and implement at least one fixturing (not shown) for part 10, as indicated in FIG. 1. Where more than one measurement technique is employed, fixturing is repeated for the different measurement techniques.

Digital radiography and optical scanning are useful techniques for measuring part 10. One example of digital radiography is computer tomography (CT), for which part 10 is scanned, for example, using an industrial CT system. Exemplary optical scanning techniques include non-contact optical three dimensional (3D) scanning, performed for example using a noncontact 3D measurement system (not shown), such as a point, line, or area based scanner, for example a light gage system combined with rotatary positioning and fixturing parts (also not shown). Other exemplary measurement techniques include infrared radiometry and using a coordinate measuring machine (CMM). In addition, data acquisition is not limited to a single measurement technique. On the contrary, in one example embodiment, part 10 is scanned using computer tomography after fixturing. In this embodiment, part 10 is also scanned using a point, line, or area based scanner. Both the data acquired from the CT scan and from the point, line, or area based scan are used to generate editable geometry 112, for this embodiment. Advantageously, using multiple measurement techniques provides additional information about part 10.

Because the part 10 may be damaged or worn, a CAD model of part 10 is desirably editable to either alter specific characteristics, such as edges, or to augment the CAD model from the data. It may further be desirable to evaluate and adjust surface quality, particularly between adjacent features. Surface quality includes surface smoothness, geometric continuity at surface junctions and internal surface structure. The processes identified in block 1 in FIG. 1, namely generation of editable geometry 112 for part 10 from measurement data 15, are illustrated in block form in FIG. 2. According to one embodiment, a non-parametric computer aided design CAD model 212 for the part 10 is generated from the geometric data. Next, non-parametric CAD model 212 is reconstructed to obtain the editable geometry 112, reconstruction comprising performing reverse CAD modeling. One exemplary reverse CAD modeling process includes extracting a set of constant {u,v} curves from surfaces 18 and then relofting surfaces 18 using the constant {u,v} curves to obtain an editable, non-parametric CAD model (also indicated by reference numeral 112) of part 10, for example using one of the above noted commercial CAD systems.

Figure 2:
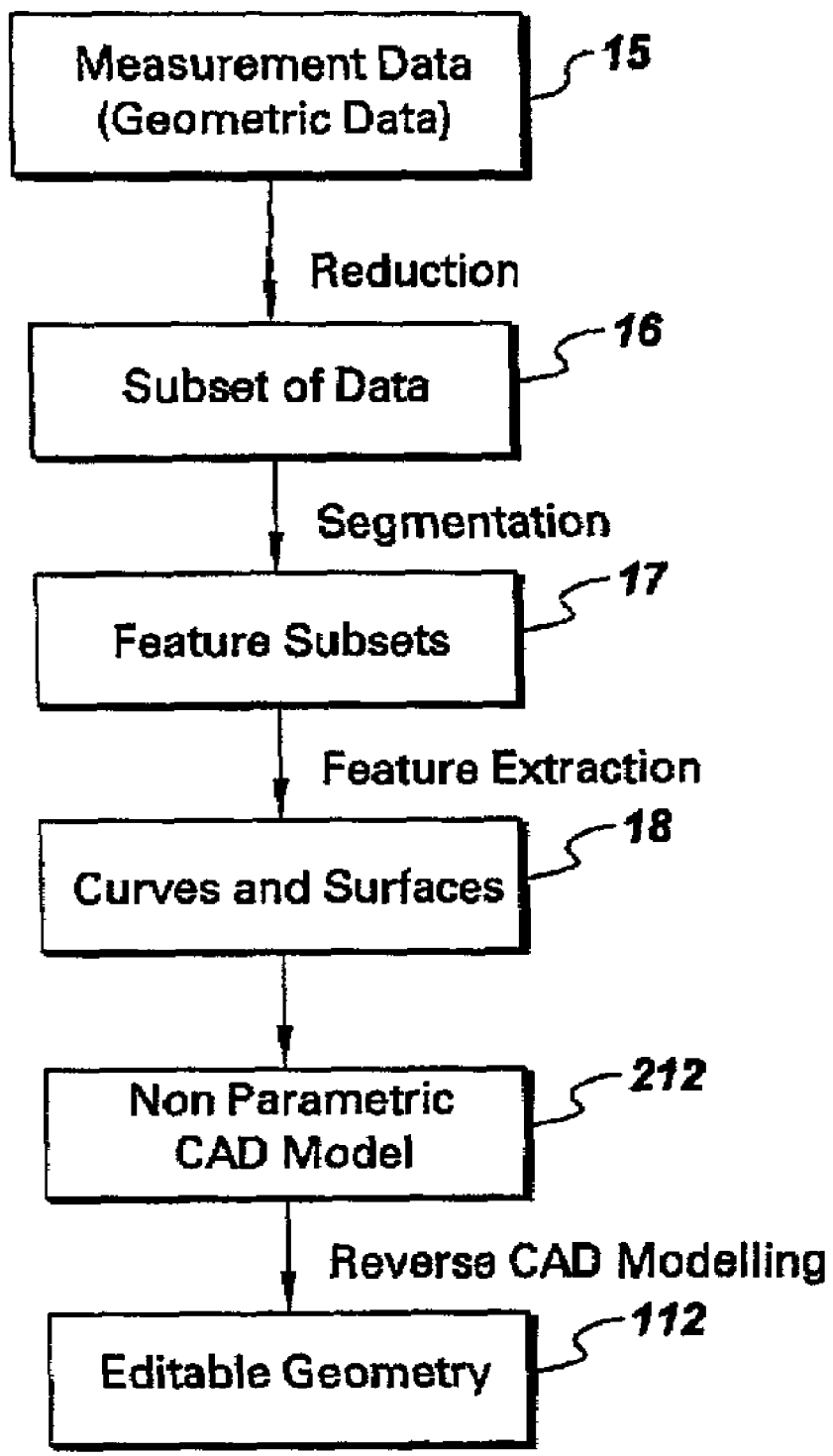
FIG. 2 shows a block diagram for generation of an editable geometry from measurement data obtained for the part.

According to a more particular embodiment, non-parametric CAD model 212 is generated as follows. First, the data are reduced to obtain a subset 16 of the data, as shown in FIG. 2. Exemplary data reduction includes removing redundant data points to reduce the data to a manageable subset 16. The subset is then segmented to obtain a number of feature subsets 17 of the data, each feature subset corresponding to a feature of part 10. Exemplary features include geometric features. For a turbine blade 10 illustrated in FIG. 9, exemplary features include an airfoil 11, a platform 12, and a dovetail 13. Next, geometric feature extraction is performed to obtain a set of curves and surfaces 18 from feature subsets 17. The curves and surfaces characterize the features of part 10. Curves and surfaces 18 are imported into a computer aided design (CAD) geometry to obtain non-parametric CAD model 212. Alternatively, curves and surfaces 18 can be generated using the CAD system.

Segmentation and geometric feature extraction are known processes and can be performed using commercial software. For example, commercial software, such as Surfacer®, which is supplied by EDS Corp., can be used to perform segmentation. For turbine blade 10, one exemplary segmentation obtains feature subsets 17 of the data corresponding to airfoil 11, platform 12, and dovetail 13. For this example, one exemplary geometric feature extraction extracts curves and surfaces based on the feature subsets that characterize airfoil 11, platform 12, and dovetail 13. Commercial software, such as Surfacer®, can be used to perform the geometric feature extraction.

According to a more particular embodiment, segmentation comprises performing functional space decomposition. Namely, the 3D Euclidean space around a data point is functionally subdivided and assigned a bit code, thereby facilitating decision making on adjacency and connectivity issues. Beneficially, measuring part 10 and generating editable geometry 112 from the measurement data permits computer modeling of existing parts that do not have CAD designs due to the age of the parts or poor archiving.

Although editable geometry can be altered, for example using CAD software, editing is performed in a piecemeal fashion. In order to obtain a flexible representation of part 10 described by a set of parameters, for example length, width, and height, all of which can vary, parametric master model 114 is generated from editable geometry 114, as noted above. According to a particular embodiment, generation of parametric master model 114 includes identifying and extracting a number of critical parameters 113 from editable geometry 112. Exemplary critical parameters 113 include dimensions and curvatures for part 10 and are identified, for example, by a user. The identification is performed, for example, as a preliminary stage of the method, prior to collection of measurement data 15 and generation of editable geometry 112. Alternatively, the identification is performed upon examining editable geometry 112 using a CAD system.

As used here, the phrase "extraction of critical parameters" 113 means determining existing or desirable values for critical parameters 113 using editable geometry 112. For example, when using the inventive method to reverse engineer part 10, extraction includes determining the existing values for these parameters. However, because part 10 may be damaged or worn, exemplary extraction of existing values includes extrapolation of the values obtained from editable geometry. Alternatively, when using the inventive method to reengineer part 10, extraction includes both determination of the existing values of critical parameters 10 (including extrapolation of the values obtained from editable geometry for a worn or damaged part 10) and applying engineering knowledge to improve the existing values obtained from editable geometry 112.

According to a more particular embodiment, critical parameters 113 are extracted as shown in FIG. 3. A set of knowledge based engineering (KBE) part design generative rules 116 are applied to editable geometry 112, which is stored in CAD Program 40, to obtain parametric master model 114. KBE part design generative rules 116 incorporate engineering know-how to construct a parametric geometry for part 10 and are implemented in a knowledge-based environment 118, for example using EDS's Knowledge Fusion, which is a knowledge based engineering module for the Unigraphics environment, or using Intent Knowledge Station, which is supplied by Heidi Corp. Although knowledge based environment 118 is illustrated in FIG. 3 as being external to CAD program 40, knowledge based environments can be either internal or external to a CAD Program, and the invention encompasses both internal and external knowledge based environment 118.

Exemplary KBE part design generative rules 116 specify the relationships between the critical parameters 113 and other attributes of editable geometry 112. Moreover, exemplary part design generative rules 116 include geometric and non-geometric engineering rules. For example, a geometric rule is a desired length to width ratio for airfoil 11. One exemplary non-geometric rule is an estimated number of airfoils per blade row based upon empirical data and thrust, flow and efficiency requirements. Another exemplary non-geometric rule is to consider material thermal stress limits as they relate to the weight and strength of the material. The codes underlying KBE part design generative rules 116 may be executed, for example, in a spreadsheet or using simulation code. Values can also be obtained by searching a database, for example a material database. According to a particular embodiment, KBE part design generative rules 116 are validated based on actual measured parts 10. In this manner, Knowledge Based Environment 118 controls creation of the parametric geometry in CAD Program 40 for part 10 by calling functions in CAD program 40. Beneficially, KBE part design generative rules 116 capture the engineering know-how of engineers with considerable experience for the part family, thereby reducing the burden of the reverse and reengineering processes on these experienced engineers.

In order to ensure that parametric master model 114 satisfies a number of functional and manufacturability requirements, a set of KBE part design checking rules 117 is applied to parametric master model 114. For blade 10, exemplary functional and manufacturability requirements include a calculated stress below maximum stress criteria and a selected fillet radius larger than minimum fillet radii required for manufacturing. However, the functional and manufacturability requirements vary based on the part 10 being re-engineered. More particularly, KBE part design rules 117 are implemented in Knowledge Based Environment 118, as indicated in FIG. 3. Exemplary checking rules involve running an analysis 121 to evaluate parametric master model 114. Databases 50 storing operating conditions and other data necessary for running analysis 121 are accessed via a Linked Model Environment (LME) 30, as indicated in FIG. 3.

Figure 4:
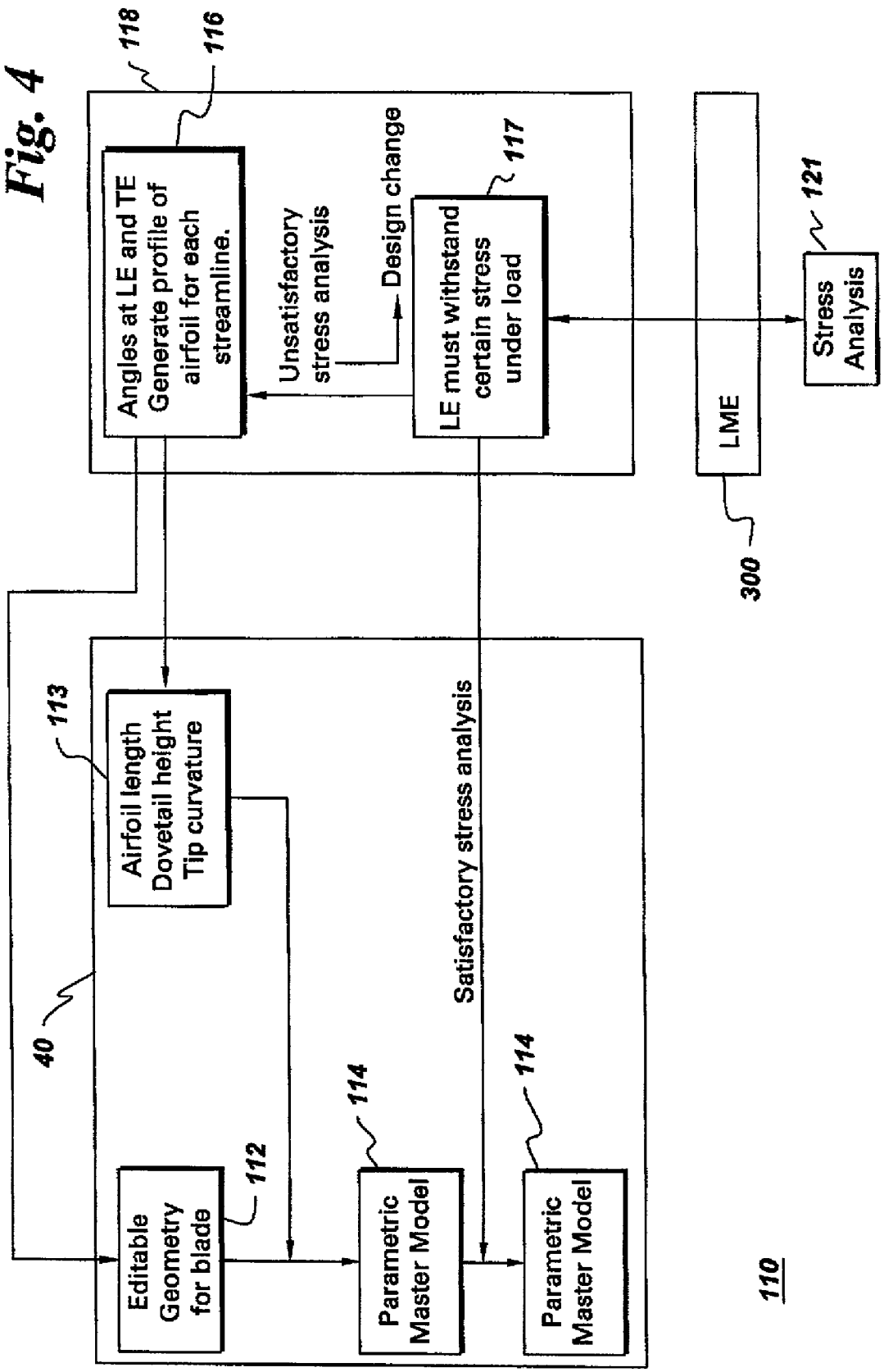
FIG. 4 shows a hybrid system/process block diagram illustrating a specific example, for a turbine blade, of the process of FIG. 3.

FIG. 4 illustrates one exemplary application of KBE part design generative and checking rules 116, 117. For blade 10, one exemplary KBE part design generative rule 116 is that angles at a leading edge 21 and a trailing edge 22 of airfoil 11 generate the profile of airfoil 11 for each streamline. For blade 10, one exemplary KBE part design checking rule 117 is that a region of part 10, for example leading edge 21, has to withstand a certain stress under load. Application of the KBE part design checking rule 117 triggers a stress analysis 121 via LME 30. Performing stress analysis 121 includes meshing parametric geometry 114, applying boundary conditions, executing a stress analysis code, and determining whether the peak stress on leading edge 21 satisfies the KBE part design checking rule 117. If not, a number of corrective measures can be employed. For example, a design change is made or the parametric geometry is modified. According to one embodiment, parametric master model 114 is revised and stress analysis 121 is repeated one or more times, until the results of stress analysis 121 are satisfactory. Alternatively, revision of parametric master model 114 and repetition of stress analysis 121 are repeated a predetermined number of times and the iteration providing the most satisfactory stress analysis results is selected.

Figure 5:
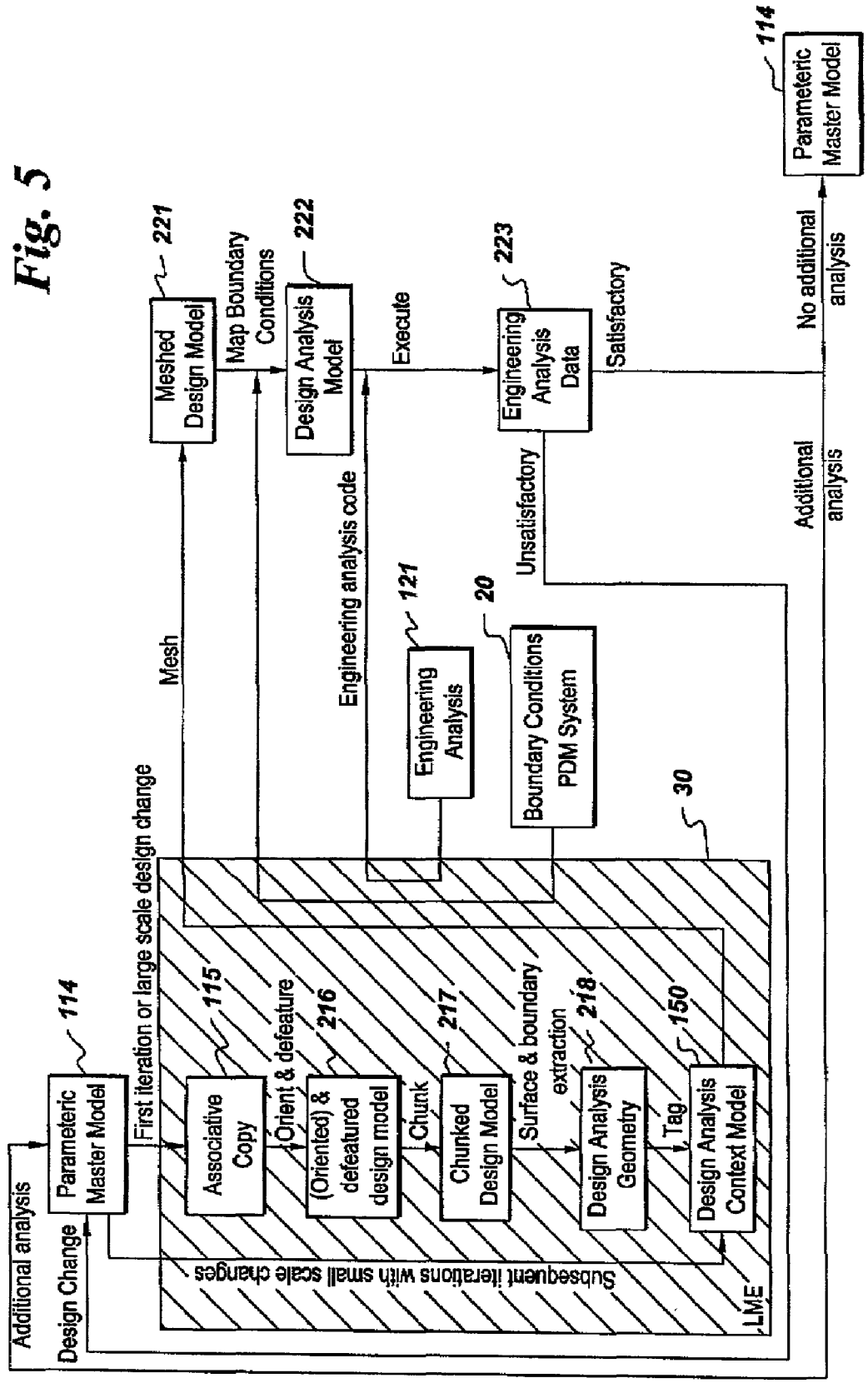
FIG. 5 shows a hybrid system/process block diagram for generation of a design analysis context model from the parametric master model, for preparing the design analysis context model for execution of an engineering analysis, and for executing the engineering analysis to evaluate the parametric master model.

Just as in designing a new part, it is useful to perform one or more engineering analyses (also indicated by reference numeral 121) to re-engineer part 10. Examples of engineering analyses include stress, heat transfer, fluid dynamic, and combustion analyses. According to a particular embodiment, the method further includes creating at least one design analysis context model 150 for performing an engineering analysis 121. As shown in FIG. 5, design analysis context model 150 is created in linked model environment 30. Advantageously because design analysis context model is created in LME 30, it is automatically updated when changes to parametric master model 114 are made. By way of background, a linked model environment (LME) is a methodology that encompasses using commercial or proprietary code in a manner that is seamless to the end user. More particularly, a typical LME links a geometry stored in a CAD Program to an external analysis code. One example of a typical LME is a C program that takes a Unigraphics context model for finite element analysis, runs the context model through ICEM to create a meshed ANSYS input file, and then runs ANSYS to generate the results. Exemplary LME's include an interface, a script, a program, and a collection of programs.

As shown in FIG. 5, the design analysis context model 150 includes an associative copy 115 derived from parametric master model 114. Associative copy 115 is configured for performing engineering analysis 121. "Associative," as used herein, means that there exists a master-slave relationship between parametric master model 114 and associative copy 115. In other words, parametric master model 114 is abstracted to a level of detail necessary to perform the engineering analysis (e.g., the necessary detail may comprise only one specific portion of part 10). For example, when modeling blade 10, if a specific portion of blade 10 (e.g., airfoil 11 or leading edge 21) is needed for the engineering analysis, it is abstracted from parametric master model 114 into associative copy 115. Because of the master-slave relationship, associative copy 115 is synchronized to parametric master model 114. For example, changes to parametric master model 114 are reflected in associative copy 115. According to a more particular embodiment, context model 150 is linked to parametric master model 114 via an assembly file.

In order to perform the engineering analysis, context model 150 must be compatible with an engineering analysis program 121. Typical engineering analysis programs, for example, provide algorithms for the solution of mechanical stress, heat transfer, modal analysis, buckling, and computational fluid dynamics problems, and examples include, but are not limited to, ANSYS, ABAQUS and Star-CD™. To render context model 150 compatible with engineering analysis program 121, context model 150 is created as shown in FIG. 5, according to a more particular embodiment. As indicated in FIG. 5, associative copy 115 is oriented and defeatured using a number of analysis code guidelines to obtain a defeatured design model 216. For example, engineering analysis 121 may require rotation of associative copy 115 by ninety degrees, as shown in FIG. 5. Defeaturing is performed to obtain the subset of associative copy 115 necessary to run engineering analysis 121, while removing portions of associative copy 115 that are not needed for executing engineering analysis 121.

To simplify meshing for engineering analysis 121, defeatured design model 216 is chunked using the analysis code guidelines to obtain a chunked design model 217. "Meshing," as used herein, means subdividing a parametric shape into pieces small enough to allow the field quantities of interest to be approximated by using polynomials, for example. As used here, the term meshing includes both "meshing" used in finite element analysis (FEA) programs and "gridding" used in computational fluid dynamics (CFD) programs. Another term used for meshing in the art is "discretization."

"Chunking," as used herein, means subdividing defeatured design model 216 into a collection of simple shapes (for example six-sided volumes) where the boolean sum of the simple shapes make up the original shape and where each shape contains the full information of the parent geometry. It will be appreciated by one of ordinary skill in the art that the spatial relationship between the geometries of parametric master model 114 and the simple shapes of chunked design model 217 is retained by using a method of assembly functionality. Assembly functionality, as used herein, means the ability of a CAD system to handle spatial relationships between parts. A system that offers such functionality, for example, is Unigraphics™ sold by Unigraphics Solutions.

To obtain a design analysis geometry 218 for performing engineering analysis 121, surface and boundary extraction is performed on chunked design model 217 using the analysis code guidelines. Design analysis geometry 218 is tagged to obtain design analysis context model 150. Tagging is performed to accommodate typical engineering analysis programs, which require unique identifiers ("tags") of topological entities (e.g., solid bodies, faces, edges, etc.) Typically, the tags are names or name-value pairs, where the names and values will have some meaning for the engineering analysis program. For example, a name titled "Airfoil_UIP" may be used to tag a chunked portion of an airfoil solid where the engineering analysis code needs to apply a different mesh seed. A name-value pair, for example, may be "temp=1000" which applies to a region where the engineering analysis code needs to apply a temperature boundary condition with a value of 1000.

More particularly, the orientation, defeaturing, chunking, surface and boundary extraction, and tagging are performed within LME 30, as indicated in FIG. 5.

The inventive method according to a particular embodiment, further includes preparing design analysis context model 150 for performance of the engineering analysis, as follows. Design analysis context model 150 is meshed using the analysis code guidelines to obtain a meshed design model 221, as shown in FIG. 5. Exemplary analysis code guidelines provide a user with recommendations for mesh seeds based on the resolution of the model, in view of features such as holes, fillets, and other features that may cause problems with meshing. Exemplary analysis code guidelines also provide the user with suggested modifications to previous chunking and defeaturing based on previous analyses. More particularly, translation scripts of engineering analysis programs, such as ANSYS, ABAQUS and STAR-CD™, perform the meshing, that is they tell the engineering analysis program how to mesh the model, as well as how to apply boundary conditions and loads.

By way of background, a script is a collection of commands in an ASCII (or text) file, interpreted by an operating system (for example, HP-UX or Windows 2000) or by a particular program (Unigraphics, ANSYS, etc) to automate a sequence of events that will be performed repeatedly. For example, an exemplary ANSYS script opens a meshed model from ICEM (name supplied by the user can be set for each run of the script), applies boundary conditions to particular tagged regions in the meshed model (supplied in an ASCII file generated by KBE rules), runs the analysis, and returns a predetermined set of results in a particular format to an output file.

As shown in FIG. 5, a number of boundary conditions are mapped onto meshed design model 221 using the analysis code guidelines to obtain a design analysis model 222. For example, the translation scripts perform the mapping. Exemplary boundary conditions are obtained from operating conditions, for example pressures, temperatures, and loads for blade 10. More particularly, operating conditions such as pressures and temperatures may need to be averaged, interpolated, or extrapolated to obtain the boundary conditions, depending on the number of node points and the fidelity of the operational data. In addition, boundary conditions may include operational data such as RPM, which is an input to generative rules for the disk size of compressor and turbine disks, for example. Other exemplary boundary conditions are obtained from the material type and microstructure for part 10. Still other exemplary boundary conditions include analysis results, for example results from previously performed engineering analyses. Boundary conditions, such as the material of part 10, are stored for example in a product data management (PDM) system 20, for example iMAN from Unigraphics and eMatrix. The boundary conditions are mapped, according to one embodiment, by linking the PDM system 20 through a linked model environment (LME) 30, such as the LME methodology available through Unigraphics Wave. Moreover, the preparation may further include identification (for example, using the translation scripts) of standard shapes and loadings, for which closed form engineering solutions are known.

The inventive method according to a more particular embodiment, further includes performing the engineering analysis on design analysis model 222 to obtain engineering analysis data 223. More particularly, an engineering analysis code is executed using the design analysis model 222 and a number of convergence criteria. Convergence criteria determine if all of the user-specified constraints, the equation solvers are trending toward a solution. Exemplary engineering analyses include thermal and stress analyses and are performed, for example, by applying a finite element or a finite difference method, thereby generating a data file. Typical data file content includes values of stresses, displacements, pressures, temperatures, or velocities. For example, the engineering analysis code is stored on a simulation engine, which is a server that provides engineering analysis through generalized interfaces defined by wrapping the engineering analysis codes.

The engineering analysis data 223 is desirably used to revise the design underlying parametric master model 114, in order to improve its performance. For example, the engineering analysis data are evaluated and, if deemed unsatisfactory, the design for part 10, and hence parametric master model 1114, are modified using a set of redesign goals, as indicated in FIG. 5. The redesign goals vary based on implementation. However, exemplary redesign goals for blade 10 include cooling efficiency, reduced weight, and lower peak stress. In contrast, if the results of the evaluation are found to be satisfactory, parametric master model 114 is not altered, as indicated in FIG. 5. Evaluation of the engineering analysis data 223 is performed by an automated computer program (e.g., iSIGHT™ by Engineous Software or ModelCenter™ by Phoenix Integration) or alternatively by an operator. If the performance is deemed unsatisfactory, the automated computer program or operator revises the design for part 10 by modifying the geometric parameters characterizing part 10. This in turn updates parametric master model 114. Further, because design analysis context model 150 includes an associative copy 115 of parametric master model 114, design analysis context model 150 is updated. Accordingly, it is unnecessary to repeat the orientation, chunking, performance of surface and boundary extraction, and tagging, as indicated in FIG. 5 for the second and all subsequent iterations, provided any changes made to the design are on a small parametric scale. However, for topological changes to the design or for changes to the design on a large parametric scale, such that applying the same chunking through tagging would create poor results, the scripts are desirably revisited to account for changes in the meshing strategy. The method encompasses both possibilities.

After updating parametric master model 114 (and by association, design analysis context model 150), it is useful to repeat engineering analysis 121, to determine whether performance is improved. Repetition of engineering analysis 121 involves, for example, meshing and mapping of boundary conditions to obtain design analysis model 222, as discussed above with respect to the original performance of engineering analysis 121. The engineering analysis code is then executed to obtain a new set of engineering analysis data, as discussed above. It will be appreciated that "repetition" of engineering analysis 121 for design changes on a small parametric scale involves the execution of existing scripts created in the meshing, mapping, and execution steps discussed above. These scripts do not need to be recreated in subsequent iterations because of their dependency on the tagged geometry initially developed in the creation of design analysis context model 150. Alternatively, for topological and large parameter scale design changes, "repetition" of engineering analysis 121 includes revisiting the scripts to account for changes in the meshing strategy.

In one embodiment, parametric master model 114 is revised and engineering analysis 121 is repeated until satisfactory results are obtained. In an alternative embodiment, parametric master model 114 is revised, and engineering analysis 121 is repeated, a given number of times, for example five (5) times, to accommodate time or computational constraints. For this embodiment, the optimal results for a given set of criteria are selected from the iterations, for example by the automated computer program or operator. More generally, the pre-determined number of iterations may be one or more, depending on implementation.

According to a more particular embodiment, at least one additional context model (not shown) is generated and an additional engineering analysis is performed to further evaluate the performance of the design. For example, after satisfactory completion of a thermal analysis, a stress analysis is performed. The additional context model is generated and the additional engineering analysis is performed in the manner described above with respect to context model 150 and shown in FIG. 5. For this embodiment, parametric master model 114 is revised and the additional engineering analysis is repeated, as discussed above with respect to engineering analysis 121, to obtain a satisfactory design (and corresponding parametric master model 114). A satisfactory design for blade 10, for example, meets all imposed thermal, stress, and displacement constraints. In the alternative embodiment, parametric master model 114 is revised, and the additional engineering analysis is repeated a given number of times, and the optimal design for part 10 is selected from the iterations.

As noted above, parametric master model 114 desirably provides a part design for the entire part family of part 10. Thus, by changing the values of the parameters, designs for different members of the part family are provided, without repetition of the reengineering process.

Figure 7:
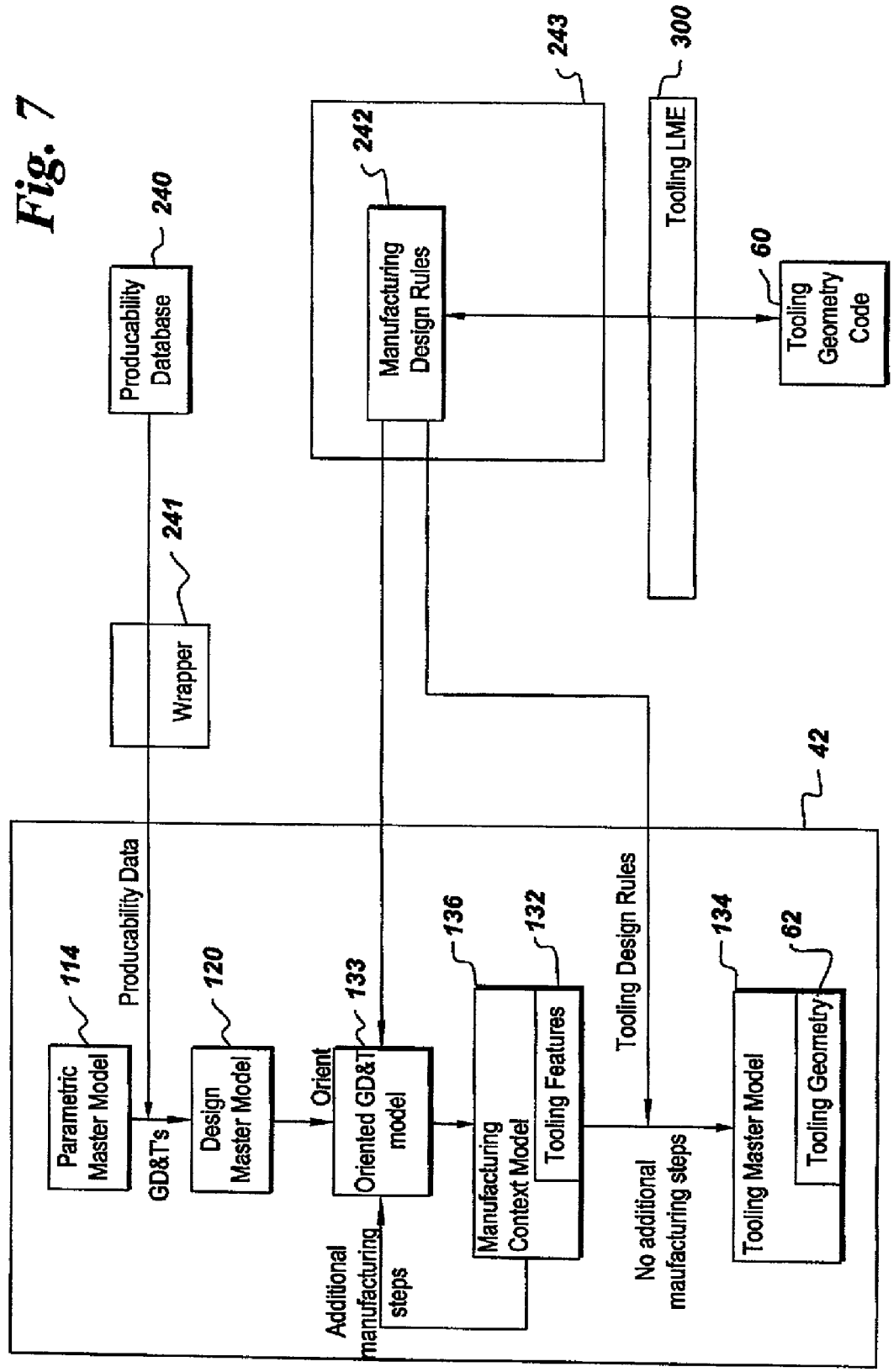
FIG. 7 shows a hybrid system/process block diagram for generation of the tooling master model from the parametric master model.

After parametric master model 114 has been finalized, geometric dimensions and tolerances (GD&Ts or "geometric tolerances") are desirably added to parametric master model 114 in preparation for manufacturing. GD&Ts specify the maximum allowable deviation from the nominal size and shape specified by the part design underlying parametric master model 114. In one embodiment, the inventive method further includes processing parametric master model 114 with producibility data from a producibility database 240 to add GD&Ts to parametric master model 114, as shown in FIG. 7. For example, parametric master model 114 is linked to producibility database 240 via a Wrapper 241. Wrappers are application interface codes that wrap around an analysis program, and one example is a Federated Intelligent Product Environment (FIPER) wrapper. Exemplary producibility data include process capability limits, for example, for surface flatness for a casting operation. For this embodiment, design master model 120 includes parametric master model 114 with geometric dimensions and tolerances.

After design master model 120 has been generated, manufacturing context model 136 is generated. As noted above, manufacturing context model 136 prescribes the end result (or "shape") of the part for each of the manufacturing steps and includes tooling features 132. Manufacturing steps include all types of manufacturing processes, for example forming steps, material addition steps (for example, deposition), material removal steps (for example, machining, EDM, and ECM), rapid prototyping steps (for example, stereolithography), and finishing steps (for example, shot peening or laser peening). Exemplary machining steps include tool path generation. The tooling features are parametric geometries for part features. Exemplary tooling features for blade 10 include airfoil tooling geometry (not shown) for forming airfoil 11, a cavity tooling geometry for forming dovetail 12, and a platform tooling geometry for forming platform 13. An exemplary airfoil tooling geometry includes pressure side and suction side tooling sub-features (not shown) for forming pressure side 160 and suction side 161 of airfoil 11. More particularly, manufacturing context model 136 is generated as indicated in FIG. 7, according to particular embodiment. As shown in FIG. 7, parametric master model 114 with geometric dimensions and tolerances is oriented to obtain an oriented GD&T model 133. As used here, the term "orient" refers to spatial orientation. For the embodiment shown in FIG. 7, the orientation is performed in a CAD Program 42. CAD Programs 40, 42 are identified by distinct reference numbers to signify that they are being used in the generation of parametric master model 114 and tooling master model 134, respectively. However, the same CAD Program can be used to generate parametric master model 114 and tooling master model 134. Accordingly, the use of two reference numbers should not be understood to require two CAD Programs but rather to indicate the different processes being performed therein.

A number of manufacturing design rules 242 are applied to oriented GD&T model 133 to obtain manufacturing context model 136. Manufacturing design rules 242 include tooling design rules for forming steps and tool path generation rules for machining steps and represent the experience of tooling designers for part 10 and more generally, for the part family. Exemplary tooling design rules 242 include formulas and other relationships between parameter values. More complex tooling design rules 242 involve execution of tooling geometry code 60. As shown in FIG. 7, execution of tooling geometry code 60 is performed via a tooling linked model environment (LME) 244. More particularly, manufacturing design rules 242 are implemented in a tooling knowledge based environment 243. Beneficially, the manufacturing design rules 242 capture the tooling design know-how of experienced engineers, thereby reducing the demands of the tooling design process on such engineers. For the embodiment shown in FIG. 7, manufacturing context model 136 is generated in CAD Program 42. Although tooling knowledge based environment 243 is shown in FIG. 7 as being separate from CAD Program 42, knowledge based environments can be either internal or external to CAD Programs and the invention covers tooling knowledge based environments 243 internal or external to CAD Program 42. For example, Knowledge Station is an external knowledge based environment, whereas Knowledge Fusion is an internal knowledge based engineering module for the Unigraphics CAD program.

Figure 10:
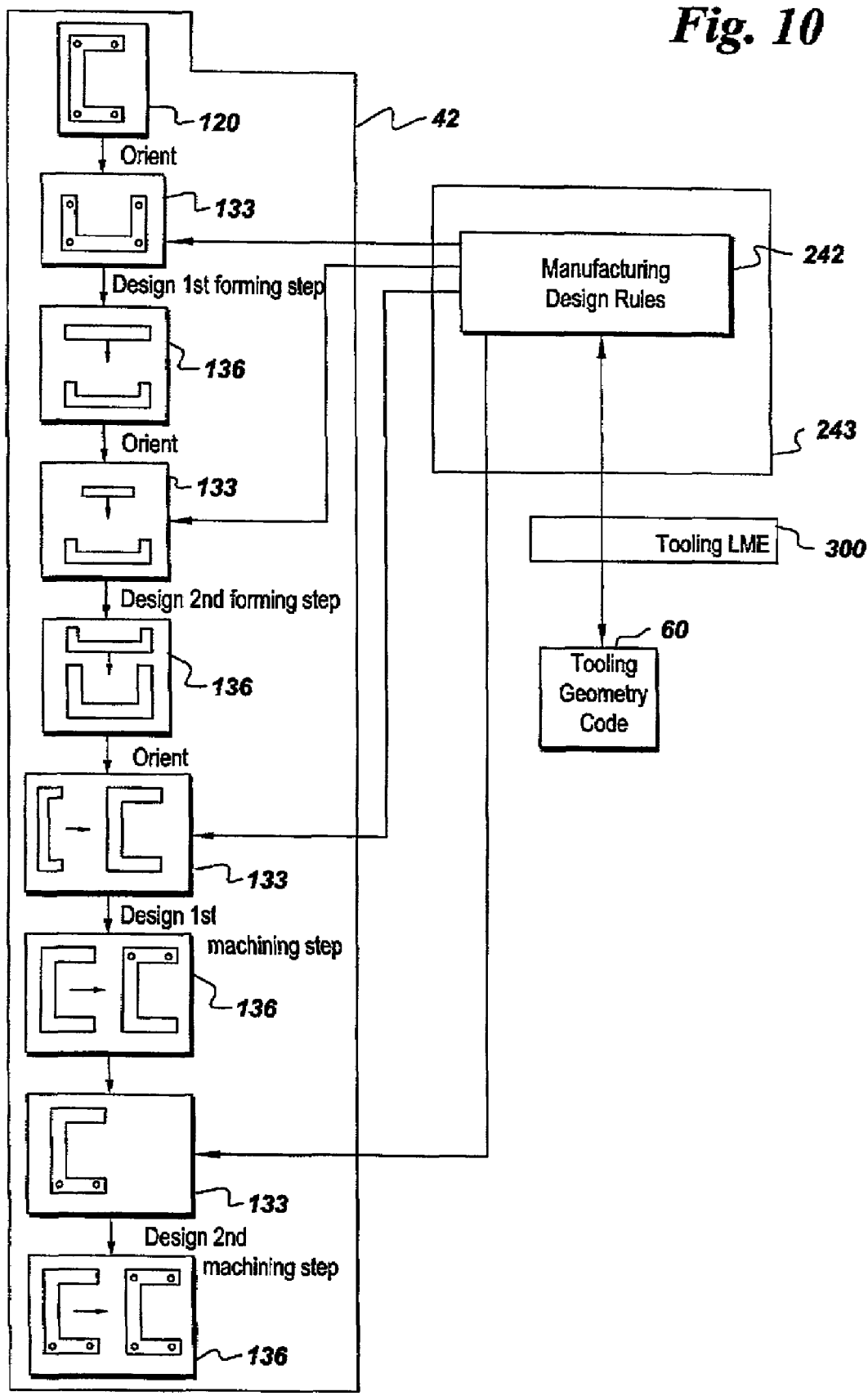
FIG. 10 shows the generation of a manufacturing context model for a hypothetical part, the manufacture of which involves four manufacturing steps.

In the event that only one manufacturing step will be used, such as for a simple part (e.g., injection molded plastic screws), manufacturing context model 136 is generated in this manner. However, for more complex parts, such as blade 10, several manufacturing steps may be performed, for example to form airfoil 11, platform 12, and dovetail 13 and to machine holes, for example radial cooling holes (not shown) in airfoil 11. For illustrative purposes only, FIG. 10 shows the generation of a manufacturing context model 136 for a hypothetical part 10, the manufacture of which involves two forming steps and two machining steps. Where more than one manufacturing step will be employed, generation of manufacturing context model 136 further includes orienting manufacturing context model to obtain oriented GD&T model 133, as indicated in FIG. 7 and illustrated in FIG. 10. The manufacturing design rules 242 for an additional manufacturing step are applied to oriented GD&T model 133 to generate manufacturing context model 136 encompassing the additional manufacturing step, as shown in FIG. 10. This process is repeated for each of the additional manufacturing steps to generate manufacturing context model 136 encompassing the additional manufacturing steps. As indicated in FIG. 10, manufacturing context model 136 prescribes the shape of the part being manufactured and specifies the tooling features 132 for each of the manufacturing steps performed during the manufacturing process.

In addition to forming steps, such as forging, the manufacture of part 10 may include one or more machining steps, for example lasing a number of holes in part 10. Accordingly, for another embodiment of the inventive method, generation of manufacturing context model 134 further includes orienting manufacturing context model 136 to obtain the oriented GD&T model and applying the tool path generation rules 242 for a machining step to generate manufacturing context model 136 encompassing the machining steps, as illustrated in FIG. 10. This process is repeated for each of the machining steps to generate manufacturing context model 136 encompassing the machining steps. Tooling master model 134 for this embodiment further includes tool paths and process parameters for performing the machining steps, the tool paths being derived from manufacturing context model 136.

As noted above, manufacturing context model 136 includes tooling features 132, which provide tooling geometries for part features. However, to create the tooling (for example, dies), a tooling geometry 62 is required. Tooling geometry 62 is a model of the tooling for the one or more manufacturing steps. For the case of a two forming step manufacturing process, for example, tooling geometry 62 includes models for a first and a second tooling, with each model derived from tooling features 132 for the respective forming step. More particularly, tooling master model 134, which includes tooling geometry 62, is generated by applying tooling design rules 242 to manufacturing context model 136, to derive tooling geometry 62 from tooling features 132. For the exemplary embodiment shown in FIG. 7, tooling master model 134 is generated in CAD Program 42 by applying tooling design rules 242 using tooling knowledge based environment 243. Exemplary tooling design rules 242 impose continuity or other matching conditions for adjoining tooling features 132 to form tooling geometry 62 for part 10.

In addition to tooling geometry 62, tooling master model 134 according to a particular embodiment further includes process parameters for each manufacturing step and toolpaths. More particularly, process parameters are included as attributes in tooling master model 134 for one embodiment and are stored in a linked attribute file in tooling PDM system 320 for another embodiment. As explained above, toolpaths are included for manufacturing processes that include one or more machining steps. For example, if the manufacturing step is a forging, an exemplary tooling geometry 62 includes a die geometry (derived from manufacturing context model 136) and an exemplary tooling master model 134 further includes process parameters, such as press speed, temperature, and load. If the manufacturing step is a machining operation, tooling master model 134 includes toolpaths (geometry) and process parameters, such as cutter speed, type of cutter, and feedrate.

In order to evaluate tooling master model 134, it is useful to perform one or more manufacturing process analyses, such as a forging process simulation for a forged part, such as an engine disk or a compressor blade. The manufacturing process analysis is used to evaluate tooling geometry 62 to verify that the manufacturing step yields the expected output. According to a particular embodiment, the method further includes creating at least one tooling context model 141. The tooling context model 141 includes an associative copy 142 of tooling master model 134. The associative copy 142 is configured for performing a manufacturing process analysis 321. The term "associative," as explained above, means that there exists a master-slave relationship between tooling master model 134 and its associative copy 142, such that changes to tooling master model 134 are reflected in associative copy 142.

Figure 6:
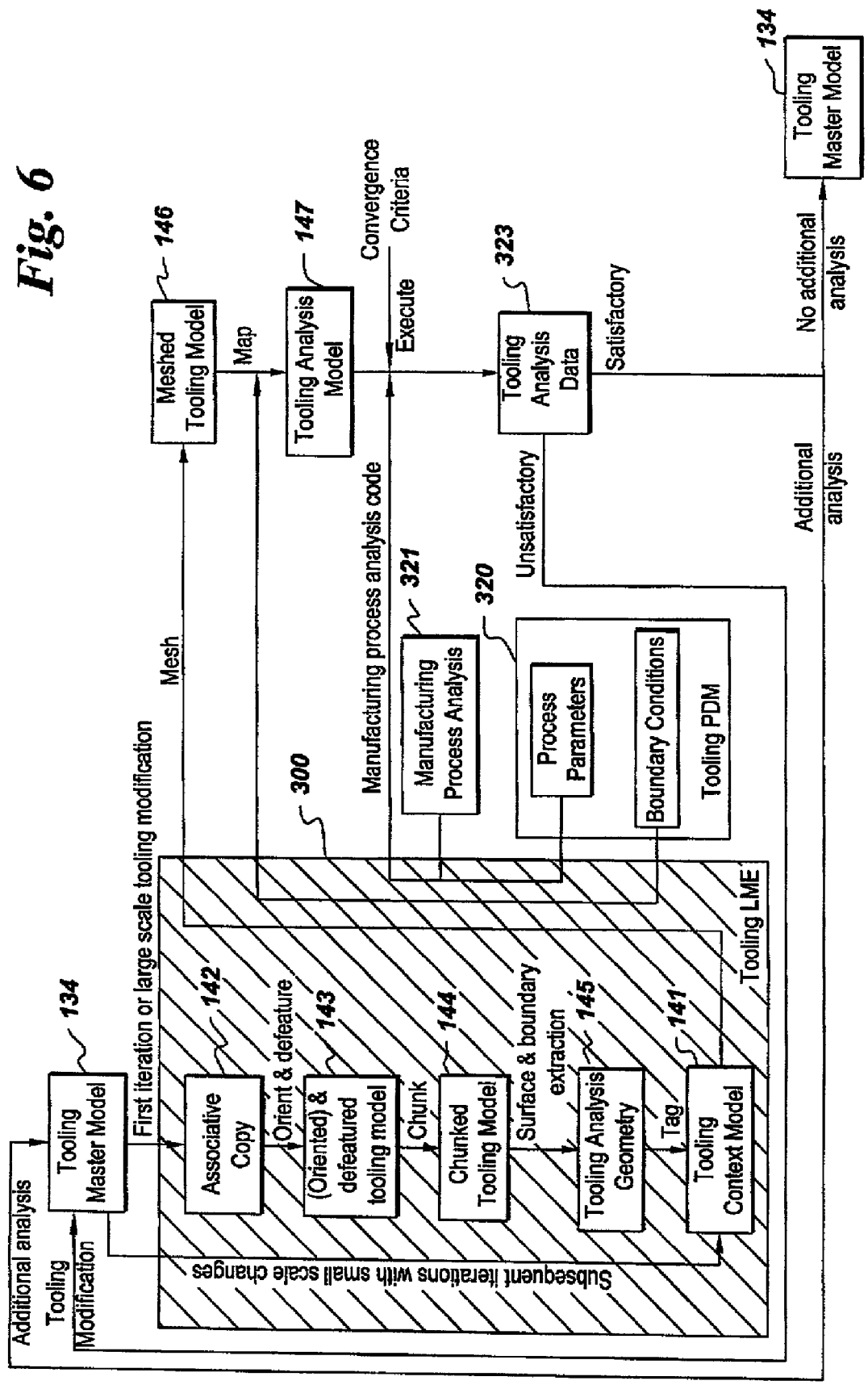
FIG. 6 shows a hybrid system/process block diagram for generation of a tooling context model from the tooling master model, for preparing the tooling context model for execution of a manufacturing process analysis, and for executing the manufacturing process analysis to evaluate the tooling master model.

An exemplary creation of tooling context model 141 is illustrated in FIG. 6 and is similar to the creation of design analysis context model 150 discussed above. As shown in FIG. 5, tooling context model 141 is created in tooling linked model environment (tooling LME) 300. Advantageously because tooling context model 141 is created using LME methodology, it is automatically updated when changes to tooling master model 134 are made. Associative copy 142 is oriented and defeatured using a set of analysis code guidelines to obtain a defeatured tooling model 143. To simplify meshing for performing manufacturing process analysis 321, defeatured tooling model 143 is chunked using the analysis code guidelines to obtain a chunked tooling model 144. To obtain a tooling analysis geometry 145 for performing manufacturing process analysis 321, surface and boundary extraction is performed on chunked tooling model 144 using the analysis code guidelines. Tooling analysis geometry 145 is tagged to accommodate typical engineering analysis programs, which require unique identifiers ("tags") of topological entities (e.g., solid bodies, faces, edges, etc.), thereby generating tooling context model 141.

According to a particular embodiment, the method further includes preparing tooling context model 141 for performance of the manufacturing process analysis, as follows. Tooling context model 141 is meshed using the analysis code guidelines to obtain a meshed tooling model 146. As shown in FIG. 6, a number of boundary conditions, for example the contact conditions between pieces of the die for forging, are mapped onto meshed tooling model 146 using the analysis code guidelines, to obtain a tooling analysis model 147. Boundary conditions are stored, for example in a tooling product data management (PDM) system 320, as indicated in FIG. 6. Tooling PDM system 320 may be PDM system 20 or may be an independent PDM system. The boundary conditions are mapped, according to one embodiment, by linking tooling PDM system 320 through tooling LME 300.

After tooling analysis model 147 is obtained, manufacturing process analysis 321 is performed thereon to obtain tooling analysis data 323, as indicated in FIG. 6. More particularly, a manufacturing process analysis code is executed using tooling analysis model 147 and a number of convergence criteria and process parameters. Exemplary process parameters include clamping forces, press speed, and temperature, and are stored for example in tooling PDM system 320. Exemplary manufacturing process analyses 321 are performed using finite element methodology and include simulation of the manufacturing process to generate data for stresses, deflections, temperatures, and strain rates for the part being manufactured and for the tooling, for example the die.

Tooling analysis data 323 are then used to evaluate tooling geometry 62 of tooling master model 134, according to a particular embodiment. More particularly, tooling analysis data 323 is evaluated, for example, by an automated computer program or operator. If tooling analysis data 323 is deemed unsatisfactory, tooling geometry 62, and hence tooling master model 134, is modified using a set of manufacturing goals and taking into account tooling design tradeoffs, as indicated in FIG. 6. The manufacturing goals and tooling design tradeoffs vary based on implementation. Typical exemplary tooling goals for blade 10 include tooling service life and material used for tooling, and exemplary tooling design tradeoffs include cost, time to make tooling, and set-up time in production. In contrast, if the results of the evaluation are found to be satisfactory, tooling master model 134 is not altered, as indicated in FIG. 6.

More particularly, if tooling analysis data 323 is deemed unsatisfactory, the automated computer program or operator revises tooling geometry 62 by modifying the geometric parameters characterizing the constituent tooling features. This in turn updates tooling master model 134, which automatically updates tooling context model 141 because of the associative relationship between tooling master model 134 and tooling context model 141. Accordingly, the orientation through tagging, steps need not be repeated for small parametric scale tooling modifications, as indicated in FIG. 6.

After updating tooling master model 134 (and by association, tooling context model 141), it is useful to repeat manufacturing process analysis 321, to determine whether performance is improved. Repetition of manufacturing process analysis 321 is indicated in FIG. 6 and is performed in the same manner as repetition of engineering analysis 121, as discussed above.

In one embodiment, tooling master model 134 is revised and manufacturing process analysis 321 is repeated until a satisfactory tooling geometry 62 (and corresponding tooling master model 134) is achieved. Alternatively, revision of tooling master model 134 and subsequent repetition of manufacturing process analysis 321 are performed a predetermined number of (one or more, for example five) times. For the latter embodiment, the optimal tooling geometry for part 10 is selected from the iterations, for example by the automated computer program or operator based on the manufacturing goals and tooling design tradeoffs. If no additional manufacturing process analyses are to be performed, tooling master model 134 corresponds to the optimal tooling geometry.

According to a more particular embodiment, at least one additional tooling context model (not shown) is generated and an additional manufacturing process analysis is performed to further evaluate the performance of tooling geometry 62. The additional tooling context model is generated and the additional manufacturing process analysis is performed in the manner described above with respect to tooling context model 141 and shown in FIG. 6. For this embodiment, tooling master model 134 is revised and the additional manufacturing process analysis is repeated, as discussed above with respect to manufacturing process analysis 321, to obtain a satisfactory tooling geometry 62 (and corresponding tooling master model 134). In the alternative embodiment, tooling master model 134 is revised, and the additional manufacturing process analysis is repeated a given number of times, and the optimal tooling geometry 62 is selected from the iterations.

Beneficially, because tooling master model 134 is a parametric model, it provides the tooling geometry for the entire part family. Thus, by changing the values of the parameters, tooling geometries for different members of the part family are automatically provided.

Figure 8:
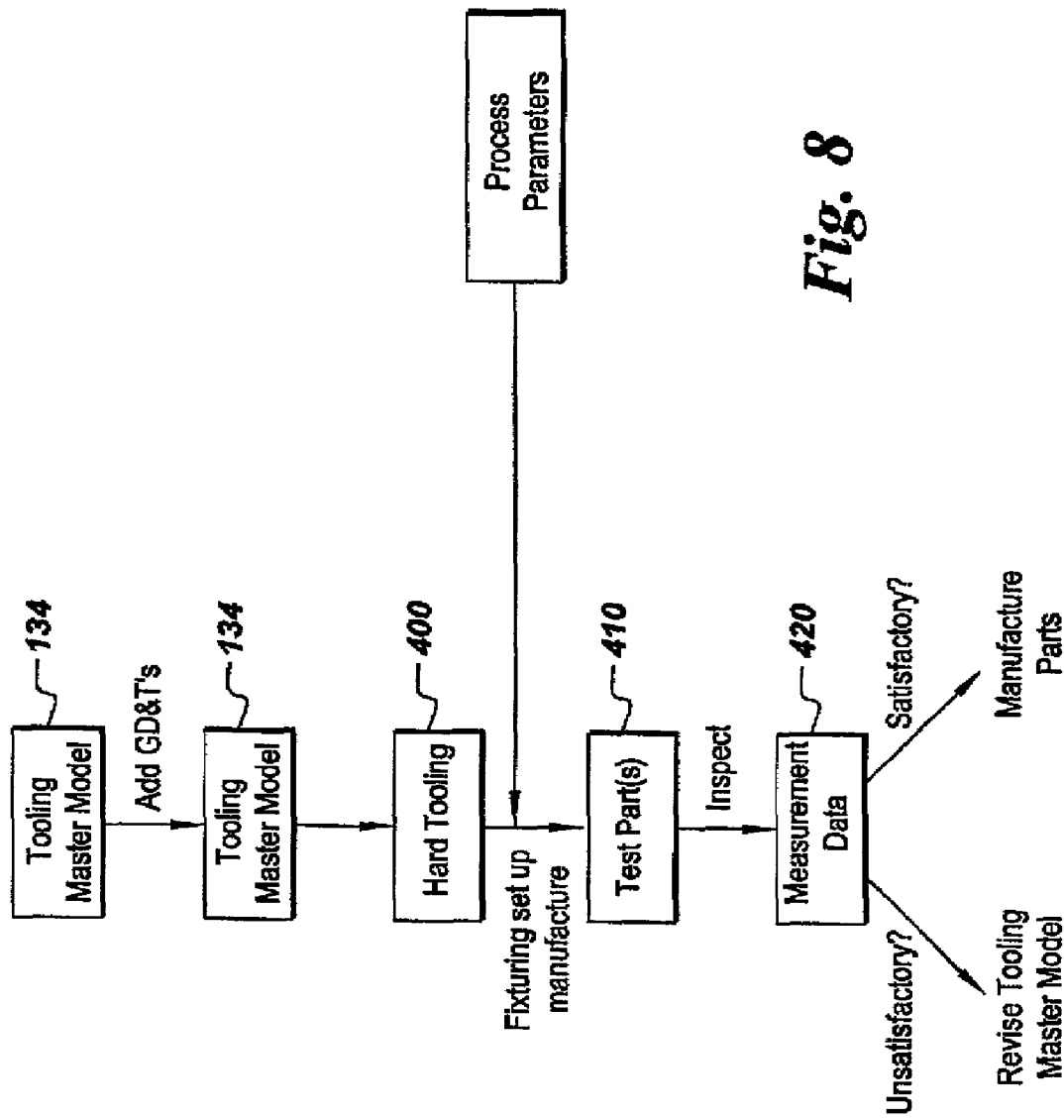
FIG. 8 shows a process block diagram for generation, testing and assessment of a hard tooling.

After generation of tooling master model 134, geometric dimensions and tolerances (GD&Ts or "geometric tolerances") are desirably added to tooling master model 134 in preparation for hard tooling (i.e., creation of the dies, molds, etc for manufacturing part 10, as reengineered). In one embodiment, GD&Ts are added to tooling master model 134 using CAD system 42, as shown in FIG. 8. For this embodiment, tooling master model 134 further includes a number of CAD drawings of a hard tooling 400, and a set of inspection data. Exemplary inspection data include geometry inspection data for hard tooling 400 to verify that the hard tooling created is what was designed. Tooling master model 134 is then used to generate hard tooling 400, using conventional hard tooling manufacturing techniques which vary based on implementation.

In order to evaluate hard tooling 400, it is useful to manufacture and inspect one or more test parts 410 using hard tooling 400, as indicated in FIG. 8. Prior to manufacturing test part 410, fixturing and set up (or preprocessing work) is performed, as indicated in FIG. 8. According to the embodiment shown in FIG. 8, the inventive method further includes manufacturing at least one test part 410 using hard tooling 400 and using process parameters. Process parameters are operating conditions that are set when manufacturing a part, for example machine parameters such as cutter speed, feed rates, press load, or general parameters such as temperature. Test part 410 is inspected, for example using one or more of the following inspection techniques: digital radiography (such as computer tomography), optical scanning (such as non-contact optical three dimensional scanning performed using a non-contact 3D measurement system, for example a point, line, or area based scanner), infrared radiometry, and using a coordinate measuring machine (CMM). Measurement data 420 obtained from the inspection is assessed by an engineer or an automated computer program to determine whether tooling master model 134 produces acceptable test parts 410, based on the engineering criteria for part 10. If test parts 410 are acceptable, tooling master model 134 and hard tooling 400 are used to manufacture parts 10. However, if test parts 410 do not satisfy the engineering criteria, tooling master model 134 is revised and reevaluated one or more times, until test parts 410 satisfy the engineering criteria for part 10.

Desirably, tooling master model 134 is used to manufacture parts having the same or improved functionality as original part 10, depending on the objectives of the re-engineering method. To this end, a method of manufacturing embodiment is disclosed. The method of manufacturing includes generating parametric master model 114 from editable geometry 112, generating manufacturing context model 136 from parametric master model 114, and creating tooling master model 134 from manufacturing context model 136, as discussed above generally with respect to FIG. 1, and more particularly with respect to FIGS. 3–7. The method of manufacturing further includes generating hard tooling 400 using tooling master model 134, for example as shown in FIG. 8, and further includes manufacturing at least one part using hard tooling 400 and the process parameters. As discussed above, exemplary process parameters include clamping forces, press speed, and temperature.

In one embodiment, editable geometry 112 is generated from data characterizing part 10, for example measurement data. In another embodiment, editable geometry 112 is generated from legacy part designs.

In a particular embodiment, parametric master model 114 is generated using KBE part design generative and checking rules 116, 117, as discussed above with respect to FIGS. 3 and 4. For this embodiment, at least one design analysis context model 150 is created, for example in LME 30, for evaluating parametric master model 114.

To add geometric dimensions and tolerances GD&Ts, parametric master model 114 is processed with producibility data from producibility database 240, as above with respect to FIG. 7. The addition of GD&Ts is performed either in CAD system 40 or in tooling CAD system 42, and these CAD systems may be the same or a different CAD system. For this embodiment, manufacturing context model 136 is generated as discussed above with respect to FIG. 7. More particularly, manufacturing context model 136 is generated for a number of manufacturing steps.

Tooling master model 134 is then created by applying tooling design rules 242 to manufacturing context model 136, according to a more particular embodiment. Further to evaluate tooling master model 134, the method more particularly further includes creating at least one tooling context model 141.

A system 100 embodiment is described with reference to FIGS. 1, 3, 4, and 7. As indicated in FIG. 1, the system 100 for engineering part 10 includes a part design master model module 110, which is configured to generate parametric master model 114 from editable geometry 112. System 100 further includes a tooling master model module 130, which is configured to receive parametric master model 114, to generate manufacturing context model 136 from parametric master model, and to create tooling master model 134 from manufacturing context model 134. The phrase "configured to" as used herein means that part design master model module 110 and tooling master model module 130 are equipped with a combination of hardware and software for performing the tasks of the invention, as will be understood by those skilled in the art. For example, part design and tooling master model modules 110, 130 include a computer equipped with software for performing their respective tasks. The present invention is not limited to any particular computer for performing the processing tasks of the invention. Rather, the term "computer" is intended to denote any machine capable of performing the calculations, or computations, necessary to perform the tasks of the invention, for example by accepting a structured input and processing the input in accordance with prescribed rules to produce an output.

As shown in FIG. 4, part design master model module 110 according to a particular embodiment includes CAD system 40 configured to generate parametric master model 114 from editable geometry 112, and knowledge based environment 118 is configured to apply KBE part design generative rules to editable geometry 112 to obtain parametric master model 114. Knowledge based environment 118 is further configured to apply KBE part design checking rules to parametric master model 114 to ensure that it satisfies functional and manufacturability requirements. As discussed above, knowledge based environment 118 can be either internal or external to CAD system 40. More particularly, CAD system 40 is further configured to generate editable geometry 112 from data characterizing part 10, such as the measurement data discussed above.

According to a more particular embodiment, part design master model module 110 further includes linked model environment LME 30 configured for creating at least one design analysis context model 150, and an engineering analysis code 121 for performing the engineering analysis. As shown, for example in FIG. 5, engineering analysis 121 is linked through LME 30. More particularly, part design master model module 110 further includes part data management PDM system 20, which is configured to store operating condition data for deriving the boundary conditions. More particularly, PDM 20 is further configured to store all other product associated data and revision history. LME 30 is configured to link PDM system 20 to meshed design model 221, to map the boundary conditions onto meshed design model 221, as indicated in FIG. 5. To add geometric tolerances to parametric master model 114, CAD system 40 is further configured to process parametric master model 114 with producibility data. Although FIG. 7 shows the latter processing step being performed in tooling CAD system 42, geometric dimensions and tolerances can be added using either CAD system 40 or tooling CAD system 42. Moreover, as discussed above CAD system 40 and tooling CAD system 42 may be either the same or different CAD systems.

As shown in FIG. 7, tooling master model module 130, according to a particular embodiment, includes tooling CAD system 42 configured to receive parametric master model 114, to orient parametric master model 114 after processing with geometric dimensions and tolerances to obtain oriented GD&T model 133, and to generate manufacturing context model 136 from parametric master model. Tooling master model module 130 further includes tooling knowledge based environment 243 configured to apply manufacturing design rules 242 to oriented GD&T model 133 to obtain manufacturing context model 136. As discussed above, manufacturing rules include tooling design rules and path generation rules.

Complex manufacturing processes may employ more than one forming step and may include one or more machining steps. Accordingly, tooling CAD system 42 is desirably configured to generate manufacturing context model for a number of manufacturing steps. For this particular embodiment, CAD system 42 is further configured to orient manufacturing context model 136 to obtain oriented GD&T model 133, and tooling knowledge based environment 243 is further configured to apply manufacturing design rules 242 to oriented GD&T model 133 to generate the manufacturing context model 136, as shown in FIG. 7.

To generate tooling master model 134 from manufacturing context model 136, tooling knowledge based environment 243 is further configured to apply the tooling design rules to manufacturing context model 136. For this embodiment, tooling CAD system 42 is further configured to derive tooling geometry 62 from manufacturing context model 136 using the tooling design rules.

In order to evaluate tooling master model 134, tooling master model module 130, according to the embodiment shown in FIG. 6, further includes tooling linked model environment (tooling LME) 300 configured for creating at least one tooling context model 141, and a manufacturing process analysis code 321 for performing the manufacturing process analysis. As shown in FIG. 6, manufacturing process analysis 321 is linked through tooling LME 300. More particularly, tooling master model module 130 further includes tooling part data management PDM system 320 configured to store operating condition data for deriving the boundary conditions and to store the process parameters. More particularly, tooling PDM 320 is further configured to store all other product associated data and revision history. As indicated in FIG. 6, tooling LME 300 is configured to link tooling PDM system 320 to meshed tooling model 146, to map the boundary conditions onto meshed tooling model 146. Tooling LME 300 is further configured to link tooling PDM system 320 to manufacturing process analysis 321, to supply the process parameters for performing the manufacturing process analysis.

In order to produce hard tooling 400, tooling CAD system 42 is desirably further configured to add geometric dimensions and tolerances to tooling master model 134, as indicated for example in FIG. 8.

Further, to re-engineer a system or subsystem rather than a part, system 100 further includes a Product Control Structure (not shown) to layout the overall system configuration and control changes in a top-down fashion.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A computer-implemented method of modeling a part comprising:
   obtaining geometric data characterizing the part;
   generating an editable geometry for the part from the data, wherein said generation of the editable geometry for the part comprises generating a non-parametric computer aided design (CAD) model for the part from the geometric data and reconstructing the non-parametric CAD model to obtain the editable geometry, said reconstruction comprising performing reverse CAD modeling;
   generating a parametric master model for the part from the editable geometry for the part;
   generating a manufacturing context model from a design master model, the design master model comprising the parametric master model and the manufacturing context model comprising a plurality of tooling features; and
   creating, and storing as a computer file, a tooling master model from the manufacturing context model, the tooling master model comprising a tooling geometry for the part.

2. The method of claim 1, wherein said obtaining comprises measuring the part to obtain the data.

3. The method of claim 2, wherein said measurement comprises performing at least one of digital radiography and optical scanning.

4. The method of claim 1, the data comprising attribute data for the part.

5. The method of claim 1, wherein said generation of the non-parametric CAD model for the part comprises:
   reducing the data to obtain a subset of the data,
   segmenting the subset to obtain a plurality of feature subsets of the data, each feature subset corresponding to a feature of the part,
   performing geometric feature extraction to obtain a plurality of curves and surfaces from the feature subsets, the curves and surfaces characterizing the features of the part, and
   importing the curves and surfaces into a computer aided design (CAD) geometry to obtain the non-parametric CAD model.

6. The method of claim 1, the data comprising legacy design information.

7. The method of claim 1, wherein said generation of the parametric master model comprises identifying and extracting a plurality of critical parameters from the editable geometry.

8. The method of claim 7, wherein said extraction of the critical parameters comprises:
   applying a plurality of knowledge based engineering (KBE) part design generative rules to the editable geometry to obtain the parametric master model, and
   applying a plurality of KBE part design checking rules to the parametric master model to ensure that the parametric master model satisfies a plurality of functional and manufacturability requirements.

9. The method of claim 1, further comprising creating at least one design analysis context model, the design analysis context model comprising an associative copy of the parametric master model which is configured for performing an engineering analysis.

10. The method of claim 9, wherein at least two design context models are created, each of the design context models being configured for performing a different engineering analysis.

11. The method of claim 9, further comprising preparing the design analysis context model for performance of the analysis, said preparation comprising:
   meshing the design analysis context model using the analysis code guidelines to obtain a meshed design model, and mapping a plurality of boundary conditions onto the meshed design model using the analysis code guidelines to obtain a design analysis model,
the method further comprising:
performing the engineering analysis on the design analysis model to obtain a plurality of engineering analysis data, said performance comprising executing an engineering analysis code using the design analysis model and a plurality of convergence criteria; and
evaluating the engineering analysis data and, if the engineering analysis data are unsatisfactory, said method still further comprising:
modifying the parametric master model using a plurality of redesign goals, and
repeating said performance of the engineering analysis after modifying the parametric master model.

12. The method of claim 1, further comprising processing the parametric master model with producibility data from a producibility database to add geometric dimensions and tolerances (GD&T) to the parametric master model, wherein the design master model comprises the parametric master model with geometric dimensions and tolerances.

13. The method of claim 12, wherein said generation of the manufacturing context model comprises:
orienting the parametric master model using the geometric dimensions and tolerances to obtain an oriented GD&T model; and
applying a plurality of manufacturing design rules to the oriented GD&T model to obtain the manufacturing context model.

14. The method of claim 13, wherein said generation of the manufacturing context model further comprises:
orienting the manufacturing context model to obtain the oriented GD&T model; and
applying the manufacturing design rules to the oriented GD&T model to generate the manufacturing context model encompassing at least one additional manufacturing step, wherein said orientation and application are performed for each of the additional manufacturing steps.

15. The method of claim 13, wherein the manufacturing design rules include a plurality of tooling design rules and wherein said creation of the tooling master model comprises applying the tooling design rules to the manufacturing context model to obtain the tooling master model, wherein the tooling geometry is derived from the tooling features by said application of the design rules.

16. The method of claim 13, further comprising creating at least one tooling context model comprising an associative copy of the tooling master model which is configured for performing a manufacturing process analysis.

17. The method of claim 16, wherein at least two tooling context models are created, each of the tooling context models being configured for performing a different manufacturing process analysis.

18. The method of claim 16, further comprising preparing the tooling context model for performance of the manufacturing process analysis, said preparation comprising:
meshing the tooling context model using the analysis code guidelines to obtain a meshed tooling model, and
mapping a plurality of boundary conditions onto the meshed tooling model using the analysis code guidelines to obtain a tooling analysis model,
said method further comprising performing the manufacturing process analysis on the tooling analysis model to obtain tooling analysis data, said performance comprising executing a manufacturing process analysis code using the tooling analysis model, a plurality of convergence criteria, and a plurality of process parameters; and
evaluating the tooling analysis data and, if the tooling analysis data are unsatisfactory, still further comprising:
modifying the tooling master model using a plurality of manufacturing goals tooling design tradeoffs, and
repeating said performance of the manufacturing process analysis after modifying the tooling master model.

19. The method of claim 13, further comprising adding a plurality of geometric dimensions and tolerances (GD&Ts) to tooling master model.

20. The method of claim 19, wherein the tooling master model further includes a plurality of process parameters, the method further comprising:
generating a hard tooling using tooling master model with the geometric dimensions and tolerances;
manufacturing at least one test part using the hard tooling and using the process parameters;
inspecting test part to obtain measurement data; and
assessing the measurement data to determine whether the test parts satisfy a plurality of engineering criteria for the part.

21. A computer-implemented system for modeling a part comprising:
a part design master model module configured to generate a parametric master model for the part from an editable geometry for the part, wherein said part design master model module comprises:
a computer aided design (CAD) system configured to generate the parametric master model from the editable geometry:
a knowledge based engineering (KBE) environment configured to apply a plurality of knowledge based engineering (KBE) part design generative rules to the editable geometry to obtain the parametric master model, and to apply a plurality of KBE part design checking rules to the parametric master model to ensure that the parametric master model satisfies a plurality of functional and manufacturability requirements;
a linked model environment configured for creating at least one design analysis context model, the context model comprising an associative copy of the parametric master model and being configured for performing an engineering analysis; and
an engineering analysis code for performing the engineering analysis to generate engineering analysis data for evaluating the parametric master model;
the system further comprising a tooling master model module configured to receive the parametric master model, to generate a manufacturing context model from the parametric master model, and to create and store as a computer file a tooling master model from the manufacturing context model, wherein the manufacturing context model comprises a plurality of tooling features and the tooling master model comprises a tooling geometry.

22. The system of claim 21, wherein said CAD system is further configured to generate the editable geometry from data characterizing the part.

23. The system of claim 21, wherein said part design master model module further comprises a part data management (PDM) system configured to store operating condition data for deriving a plurality of boundary conditions, wherein said linked model environment is configured to link said PDM system to a meshed design model obtained from the design analysis context model, to map the boundary conditions onto the meshed design model.

24. The system of claim 21, wherein said CAD system is further configured to process the parametric master model with producibility data to add geometric dimensions and tolerances to the parametric master model.

25. The system of claim 21, wherein said tooling master model module comprises:
a tooling computer aided design (CAD) system configured to receive the parametric master model, to orient the parametric master model after processing with a plurality of geometric dimensions and tolerances to obtain an oriented GD&T model, and to generate the manufacturing context model from the parametric master model; and
a tooling knowledge based environment configured to apply a plurality of manufacturing design rules to the oriented GD&T model to obtain the manufacturing context model.

26. The system of claim 25, wherein said tooling CAD system is further configured to generate the manufacturing context model for a plurality of manufacturing steps.

27. The system of claim 25, wherein the manufacturing design rules include a plurality of tooling design rules, wherein said tooling knowledge based environment is further configured to apply the tooling design rules to the manufacturing context model, and wherein said tooling CAD system is further configured to derive the tooling geometry from the manufacturing context model using the tooling design rules, to generate the tooling master model.

28. The system of claim 27, wherein said tooling master model module further comprises:
a tooling linked model environment configured for creating at least one tooling context model, wherein the tooling context model comprises an associative copy of the tooling master model and is configured for performing a manufacturing process analysis; and
a manufacturing process analysis code for performing the manufacturing process analysis to generate tooling analysis data for evaluating the tooling master model.

29. The system of claim 28, wherein said tooling master model module further comprises a tooling part data management (PDM) system configured to store a plurality of operating condition data for deriving a plurality of boundary conditions and a plurality of process parameters,
wherein said tooling linked model environment is configured to link said tooling PDM system:
to a meshed tooling model obtained from the tooling context model, to map the boundary conditions onto the meshed tooling model, and
to the manufacturing process analysis to supply the process parameters for performing the manufacturing process analysis.

30. The system of claim 28, wherein said tooling CAD system is further configured to add a plurality of geometric dimensions and tolerances (GD&Ts) to the tooling master model.

31. A method of manufacturing comprising:
generating a parametric master model for a part from an editable geometry for the part, wherein said generation of the parametric master model comprises:
applying a plurality of knowledge based engineering (KBE) part design generative rules to the editable geometry to obtain the parametric master model and
applying a plurality of KBE part design checking rules to the parametric master model to ensure that the parametric master model satisfies a plurality of functional and manufacturability requirements;
creating at least one design analysis context model for evaluating the parametric master model, the design analysis context model comprising an associative copy of the parametric master model which is configured for performing an engineering analysis;
processing the parametric master model with producibility data from a producibility database to add geometric dimensions and tolerances (GD&T) to the parametric master model;
generating a manufacturing context model for a plurality of manufacturing steps from the parametric master model, the manufacturing context model comprising a plurality of tooling features, wherein said generation of the manufacturing context model comprises:
orienting the parametric master model using the geometric dimensions and tolerances to obtain an oriented GD&T model; and
applying a plurality of manufacturing design rules to the oriented GD&T model to obtain the manufacturing context model, wherein the manufacturing design rules comprise a plurality of tooling design rules;
creating a tooling master model from the manufacturing context model, the tooling master model comprising a tooling geometry for the part;
generating a hard tooling using the tooling master model; and
manufacturing at least one part using the hard tooling and a plurality of process parameters.

32. The method of claim 31, further comprising generating the editable geometry from data characterizing the part.

33. The method of claim 31, wherein said creation of the tooling master model comprises applying the tooling design rules to the manufacturing context model to obtain the tooling master model, wherein the tooling geometry is derived from the tooling features by said application of the design rules.

34. The method of claim 33, further comprising creating at least one tooling context model comprising an associative copy of the tooling master model which is configured for performing a manufacturing process analysis.

* * * * *